(12) United States Patent
Shuto et al.

(10) Patent No.: US 6,885,423 B2
(45) Date of Patent: Apr. 26, 2005

(54) METHOD FOR MANUFACTURING HOMEOTROPIC ALIGNMENT LIQUID CRYSTAL FILM

(75) Inventors: Shunsuke Shuto, Ibaraki (JP); Sadahiro Nakanishi, Ibaraki (JP); Shusaku Nakano, Ibaraki (JP); Takashi Kamijo, Ibaraki (JP); Amane Mochizuki, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/990,075

(22) Filed: Nov. 21, 2001

(65) Prior Publication Data

US 2002/0036739 A1 Mar. 28, 2002

(30) Foreign Application Priority Data

Dec. 6, 2000 (JP) .......................... 2000-370978
May 8, 2001 (JP) .......................... 2001-136848

(51) Int. Cl.$^7$ .......................... G02F 1/1337; C09K 19/00
(52) U.S. Cl. .......................... 349/127; 349/130; 349/191; 428/1.2
(58) Field of Search .......................... 428/1.1, 1.2, 349; 349/191, 127, 131, 130

(56) References Cited

U.S. PATENT DOCUMENTS

| | | | | |
|---|---|---|---|---|
| 5,498,450 A | * | 3/1996 | Akashi et al. ........... | 428/423.1 |
| 5,620,781 A | * | 4/1997 | Akashi et al. ........... | 428/195.1 |
| 5,679,414 A | * | 10/1997 | Akashi et al. ........... | 428/1.53 |
| 5,730,900 A | * | 3/1998 | Kawata ................ | 252/299.01 |
| 5,773,178 A | * | 6/1998 | Shiota et al. ........... | 430/20 |
| 6,201,588 B1 | | 3/2001 | Walton et al. | |
| 6,379,758 B1 | * | 4/2002 | Hanmer et al. ........... | 428/1.1 |

FOREIGN PATENT DOCUMENTS

| | | |
|---|---|---|
| JP | 9-3454 | 1/1997 |
| JP | 10-268318 | 10/1998 |
| JP | 2000-212310 | 8/2000 |

OTHER PUBLICATIONS

Bartolino et al. "Uniaxial and biaxial lyotropic nematic liquid crystals" Physical Review A 26(2) Aug. 1982, pp. 1116–1119.*

* cited by examiner

*Primary Examiner*—Erik Kielin
(74) *Attorney, Agent, or Firm*—Knobbe Martens Olson & Bear, LLP

(57) ABSTRACT

A homeotropic alignment liquid crystal film used for an optical film of a visual display etc. is manufactured by a method in which a side chain type liquid crystal polymer comprising a monomer unit (a) containing a liquid crystalline fragment side chain and a monomer unit (b) containing a non-liquid crystalline fragment side chain is coated on a substrate on which a vertical alignment film is not prepared, and the liquid crystal polymer is fixed while maintaining an alignment state after the liquid crystal polymer is homeotropically aligned in liquid crystal state.

10 Claims, No Drawings

METHOD FOR MANUFACTURING HOMEOTROPIC ALIGNMENT LIQUID CRYSTAL FILM

BACKGROUND OF THE INVENTION

1. Field of the Invention

The present invention relates to a method for manufacturing a homeotropic alignment liquid crystal film. Moreover, the present invention relates to a homeotropic alignment liquid crystalline composition and a method for manufacturing a homeotropic alignment liquid crystal film using the homeotropic alignment liquid crystalline composition. Furthermore, the present invention relates to a homeotropic alignment liquid crystal film and an optical film obtained by the above-mentioned manufacturing method. Moreover, the present invention relates to a visual display, such as a liquid crystal display, an organic EL display, a PDP (plasma display panel), etc., using the above-mentioned optical film. A homeotropic alignment liquid crystal film may be used as a retardation film, a viewing angle compensating film, an optical compensating film, and an elliptical polarization film independently or in combination with other optical films.

2. Description of the Related Art

Homeotropic alignment of a liquid crystal compound is obtained when the major axis of a liquid crystal phase molecule in a thin film substrate is generally substantially vertical to the film plane. Since substances that spontaneously provide homeotropic alignment are hardly known, a vertical alignment agent is generally used in order to obtain such alignment. For example, nematic liquid crystal compound is an example of a liquid crystal compound that can provide homeotropic alignment by using a vertical alignment agent. Such an outline in connection with an alignment technology of liquid crystal compound is discussed in Chemical Review 44 (Surface Reforming, edited by Chemical Society of Japan, pages 156–163).

Various kinds of organic or inorganic alignment agents are known as vertical alignment agents to homeotropically align the above-mentioned liquid crystal compounds. Many of the alignment agents commonly used are designed to be effective when used on glass substrates.

Examples of organic alignment agent include: lecitin, silanes type surface active agent, n-octadecyl triethoxy silane, titanates type surface active agent, pyridinium salts type high molecular surface active agent, hexadecyl trimethyl ammoniumhalide, or chromium complex. Organic alignment agents are dissolved in suitable volatile solvents in which active ingredient is in a very small amount (typically less than 1%), and coated by a spin coating or other well-known coating methods ori a substrate. Subsequently, the volatile solvent is evaporated to give a thin film of organic alignment agent on the glass substrate. These organic alignment agents are compounds characterized by polar end groups drawn onto polar glass surface and linear alkyl chains with non-polarity vertically arranged to glass surface. Thus, the agents have the liquid crystal compounds form homeotropic alignment on such a glass surface.

Inorganic homeotropic alignment agents include compounds that may be coated by vapor deposition, such as $SiO_x$ or $In_2O_3/SnO_2$, at a vertical angle onto a glass substrate. In addition, polyimide films with alkyl side chain are also used as homeotropic alignment films for a liquid crystal display.

However, all of the above-mentioned alignment agents commonly used provides homeotropic alignment of liquid crystal compound only on glass substrate, and do not act effectively in alignment on substrates consisting of polymer substances such as plastic films and sheet plastics. A surface of a substrate consisting of a polymer substance may be presumed to have poor affinity to polar end groups of commonly used alignment agents described above, and as a result generally do not show homeotropic alignment at all, or shows very poor alignment. Moreover, high temperature treatment is required for formation of polyimide film with alkyl side chain. However, transparent plastic films for optical use that have durability to temperature conditions in which polyimide alignment films are baked are hardly known.

SUMMARY OF THE INVENTION

The first object of the present invention is providing a manufacturing method of a homeotropic alignment liquid crystal film that can form homeotropic alignment of a liquid crystal polymer on a substrate without using a vertical alignment film. Another object of the present invention is providing a homeotropic alignment liquid crystal film obtained by the above-mentioned manufacturing method. Still another object of the present invention is providing an optical film having a homeotropic alignment liquid crystal film layer without a vertical alignment film on a substrate. A visual display may be formed using the above-mentioned optical film.

Since the side chain type liquid crystal polymer forms a film on the substrate without using the vertical alignment film, the glass transition temperature, Tg, of the liquid crystal film is designed to be low. However, the liquid crystal film is expected improvement in durability for being used as a liquid crystal display etc.

For these reasons, another object of the present invention is providing a homeotropic alignment liquid crystalline composition that can form a homeotropic alignment liquid crystal film with excellent durability on a substrate without using a vertical alignment film. Moreover, another object of the present invention is providing a manufacturing method of a homeotropic alignment liquid crystal film using the above homeotropic alignment liquid crystalline composition. Moreover, still another object of the present invention is providing a homeotropic alignment liquid crystal film obtained by the above-mentioned manufacturing method. Still another object of the present invention is providing an optical film suitable for use in a visual display that has a homeotropic alignment liquid crystal film layer without a vertical alignment film on a substrate.

The present inventors performed wholehearted research in order to solve the above-mentioned problems and found out that the above-mentioned objects of the present invention can be attained as shown below.

The present invention attaining the above described first object of the present invention relates to a method for manufacturing a homeotropic alignment liquid crystal film. A side chain type liquid crystal polymer, which comprises a monomer unit (a) containing a liquid crystalline fragment side chain and a monomer unit (b) containing a non-liquid crystalline fragment side chain is coated on a substrate on which a vertical alignment film is not prepared The liquid crystal polymer is fixed while maintaining an alignment state after the liquid crystal polymer is homeotropically aligned in liquid crystal state.

In the present invention, homeotropic alignment of a liquid crystal polymer is realized using a side chain type liquid crystal polymer comprising a monomer unit (a) containing liquid crystalline fragment side chain, and a monomer unit (b) containing non-liquid crystalline fragment side chain as a liquid crystal, without using a vertical alignment film. The side chain type liquid crystal polymer of the present invention has a monomer unit (b) that has alkyl chain etc. in addition to the monomer unit (a) contained in conventional side chain type liquid crystal polymers. It can be presumed that even without the use of a vertical alignment film, the side chain type liquid crystal polymer will be in liquid crystal state, for example, by heat treatment to form a nematic liquid crystal phase by action of the monomer unit (b). Subsequently, after heat is removed, it is vitrified to give a homeotropic alignment liquid crystal film in which a homeotropically aligned liquid crystal polymer layer is fixed.

In the manufacturing method of the above-mentioned homeotropic alignment liquid crystal film, various materials may be used as a substrate such as a polymer, glass, or metal. A polymer substrate may take the form of a sheet plastic or a plastic film. There is no limitation in the kind of substrate used for the manufacturing method of the present invention, and a glass substrate, a polymer substance and a metal may be used without limitation. The polymer substance may be used in the form of a sheet plastic or a plastic film.

Moreover, the present invention relates to a homeotropic alignment liquid crystal film obtainable by the above-mentioned manufacturing method.

In addition, the present invention relates to an optical film wherein a homeotropic alignment liquid crystal film layer comprising a liquid crystal polymer that is homeotropically aligned on a substrate without a vertical alignment layer.

According to the present invention, an optical film having a homeotropically aligned liquid crystal polymer is provided without using a vertical alignment film. The above-mentioned optical film is realized using a side chain type liquid crystal polymer comprising a monomer unit (a) containing liquid crystalline fragment side chain and a monomer unit (b) containing non-liquid crystalline fragment side chain.

Moreover, the present invention relates to a visual display applying the above-mentioned optical film.

The present invention also relates to a homeotropic alignment liquid crystalline composition comprising a photopolymerizable liquid crystal compound and a side chain type liquid crystal polymer that is able to form a homeotropic alignment liquid crystal layer on a substrate on which a vertical alignment film is not prepared.

The mixture of the side chain type liquid crystal polymer and the photopolymerizable liquid crystal compound may be homeotropically aligned by making a liquid crystal state with heat treatment to obtain a nematic liquid crystal layer. After that, the photopolymerizable liquid crystal compound may be polymerized or cross-linked to increase the durability of homeotropic alignment liquid crystal film.

In the above-mentioned homeotropic alignment liquid crystalline composition, the side chain type liquid crystal polymer preferably comprises a monomer unit (a) containing liquid crystalline fragment side chain and a monomer unit (b) containing non-liquid crystalline fragment side chain.

The above-mentioned side chain type liquid crystal polymer may be used to form a homeotropic alignment of liquid crystal polymer without using a vertical alignment film. The side chain type liquid crystal polymer has a monomer unit (b) having an alkyl chain, etc. in addition to a monomer unit (a) contained in the usual side chain type liquid crystal polymer. It can be presumed that even without a use of vertical alignment film the side chain type liquid crystal polymer will be in liquid crystal state, for example, by heat treatment to form a nematic liquid crystal phase by action of the monomer unit (b).

The present invention also relates to a method for manufacturing a homeotropic alignment liquid crystal film, wherein a homeotropic alignment liquid crystalline composition according to an embodiment of the present invention is coated on a substrate on which a vertical alignment film is not prepared. The homeotropic alignment liquid crystalline composition is homeotropically aligned in liquid crystal state and optical irradiation is applied to fix the state of alignment.

Once the liquid crystalline composition is homeotropically aligned, heat is removed and the composition is vitrified to obtain a fixed liquid crystal polymer layer that is homeotropically aligned. Subsequently a homeotropic alignment liquid crystal film with excellent durability is obtained by polymerizing or cross-linking the photopolymerizable liquid crystal compound with optical irradiation.

In the manufacturing method of the above-mentioned homeotropic alignment liquid crystal film, various substrate materials may be used such as polymer, glass, and metal. Moreover, a polymer substance is used in the form of a sheet plastic or a plastic film. There is no limitation in the kind of substrate used for the manufacturing method of the present invention, and a glass substrate, a polymer substance and a metal may be used without any limitation especially, and the polymer substance may be used in the form of a sheet plastic or a plastic film.

Moreover, the present invention relates to a homeotropic alignment liquid crystal film obtainable by the above-mentioned manufacturing method.

The present invention also relates to an optical film, wherein a homeotropic alignment film layer according to an embodiment of the present invention is homeotropically aligned and fixed, and is prepared on a substrate without a vertical alignment film.

Furthermore, the present invention relates to a visual display applying the above-mentioned optical film.

DETAILED DESCRIPTION OF THE PREFERRED EMBODIMENT

In one embodiment, a liquid crystal polymer provides homeotropic alignment through the use of a side chain type liquid crystal polymer comprising a monomer unit (a) containing liquid crystalline fragment side chain and a monomer unit (b) containing non-liquid crystalline fragment side chain.

The monomer unit (a) may be represented by the following general formula:

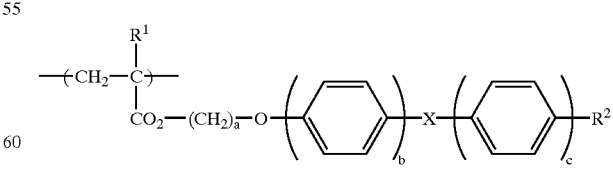

(where, $R^1$ is a hydrogen atom or a methyl group, a is a positive integer of 1 to 6, $X^1$ is —$CO_2$— group or —OCO— group, $R^2$ is a cyano group, an alkoxy group with 1 to 6 carbon, fluoro group or alkyl group with 1 to 6 carbon, and b and c are integers of 1 or 2 respectively.)

The monomer unit (b) may be represented by the following general formula:

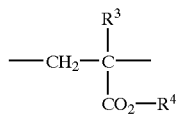

(where, $R^3$ is a hydrogen atom or a methyl group, $R^4$ is an alkyl group with 1 to 22 carbon, a fluoroalkyl group with 1 to 22 carbon, or a monomer unit represented by the general formula (c):

where, d is a positive integer of 1 to 6, and $R^5$ is an alkyl group with 1 to 6 carbon).

The ratio of the monomer unit (a) and the monomer unit (b) is not limited to a particular range. The ratio may vary according to the kinds of monomer units, since the side chain type liquid crystal polymer does not show liquid crystal monodomain alignment property when the ratio of the monomer unit (b) increases. The percentage is preferably defined in a range of (b)/{(a)+(b)}=0.01 to 0.8 (mole ratio), more preferably 0.1 to 0.5.

A weight average molecular weight of the above-mentioned side chain type liquid crystal polymer is preferably in a range of 2000 to 100000. Performance as a liquid crystal polymer is demonstrated by adjusting the weight average molecular weight into this range. The weight average molecular weight is preferably no less than 2500, because the film forming property of an alignment layer shows a tendency of being poor when the weight average molecular weight of the side chain type liquid crystal polymer is too small. On the other hand, the weight average molecular weight is preferably no more than 50000 because if the weight average molecular weight is too large the polymer has a tendency of forming a poor alignment state caused by a poor alignment property as liquid crystal.

In addition, the side chain type liquid crystal polymer may be prepared by copolymerizing acrylic type monomer or methacryl type monomer corresponding to the monomer unit (a) and monomer unit (b). The monomer corresponding to the monomer unit (a) and the monomer unit (b) is synthesized by conventionally well-known methods. The copolymer may be prepared according to common polymerizing methods of acrylic type monomers, such as radical polymerizing cationic polymerizing, and anionic polymerizing. In addition, when a radical polymerization method is applied, various kinds of polymerization initiators may be used. Initiators having a middle-ranged decomposition temperature may be used, such as azobisisobutyronitrile and benzoyl peroxide.

The photopolymerizable liquid crystal compound may be a liquid crystalline compound with nematic liquid crystalline property that has at least one unsaturated double bond as photopolymerizable functional groups, such as acryloyl group or methacryloyl group. As the photopolymerizable liquid crystal compound, the monomer unit (a) may comprise acrylates and methacrylates. To increase durability, the photopolymerizable liquid crystal compound preferably comprises a compound having two or more photopolymerizable functional groups. For example, the photopolymerizable liquid crystal compound may comprise a cross-linked type nematic liquid crystalline monomer represented by the following general formula:

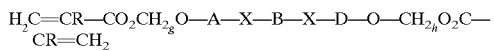

(where, R is a hydrogen atom or a methyl group, A and D are independently 1,4-phenylene group or 1,4-cyclohexylene group respectively, X is independently —COO— group, —OCO— group or —O— group respectively, B is 1,4-phenylene group, 1,4-cyclohexylene group, 4,4'-biphenylene group or 4,4'-bicyclohexylene group, and g and h are independently integers of 2 to 6 respectively).

The ratio of a photopolymerizable liquid crystal compound and a side chain type liquid crystal polymer in a liquid crystalline composition does not have particular limitation, and the ratio is suitably specified in consideration of the durability of the homeotropic alignment liquid crystal film obtained etc.

Usually, the ratio is preferably (photopolymerizable liquid crystal compound): (side chain type liquid crystal polymer) (weight ratio)=0.1:1 to 30:1, more preferably 0.5:1 to 20:1, still more preferably 1:1 to 10:1.

Photo polymerization initiator is usually contained in the above-mentioned liquid crystalline composition. Various kinds of photo polymerization initiator may be used without any particular limitation. As a photo polymerization initiator, for example, Irgacure 907, the said 184, the said 651, the said 369 etc. by Ciba Specialty Chemicals, may be used. Photo polymerization initiator is added in an amount within a range that does not disturb the homeotropic alignment property of the liquid crystalline composition, in consideration of the kind of the photo polymerization liquid crystal compound and the compounding ratio of the liquid crystalline composition etc. Usually, the amount is in a range of preferably about 0.5 to 30 weight parts to photopolymerizable liquid crystal compound 100 weight parts, and more preferably 3 to 15 weight parts.

The substrate on which the side chain type liquid crystal polymer or the liquid crystalline composition is coated may be of any form of a glass substrate, a metallic foil, a sheet plastic, or a plastic film. Thickness of the substrate is usually about 10 to 1000 μm.

No limitation exists for a plastic film if the plastic film does not show any change at the temperature at which the film is treated during alignment. As a suitable film, for example, the film may be made of transparent polymers, such as polyester type polymers, such as polyethylene terephthalate and polyethylenenaphthalate; cellulose type polymers, such as diacetyl cellulose and triacetyl cellulose; polycarbonate type polymers; acrylic type polymers, such as polymethylmethacrylate. In addition, the film may be made of transparent polymers, such as styrene type polymers, such as polystyrene and acrylonitrile-styrene copolymer; olefin type polymers, such as polyethylene, polypropylene; polyolefin having cyclic or norbornene structure, ethylene-propylene copolymer; vinyl chloride type polymers; amide type polymers, such as nylon and aromatic polyamide. Moreover, the film may be made of transparent polymers, such as imide type polymers, sulfone type polymers, polyether sulfone type polymers, polyether ether ketone type polymers, poly phenylene sulfide type polymers, vinyl alcohol type polymers, vinylidene chloride type polymers, vinyl butyral type polymers, allylate type polymers, polyoxymethylene type polymers, epoxy type polymers and blended polymers of the above described polymers. In these, a plastic film with high hydrogen bond is preferable.

Besides, as a metal film, for example, a film made of aluminum etc. may be mentioned.

A plastic film comprising polymer substance having norbornene structure, such as Zeonor (brand name, by Zeon Corporation), Zeonex (brand name, by Zeon Corporation), and ARTON (brand name, by JSR Corporation) has optically excellent characteristics. Since these polymer substances (plastic film) have a very small optical anisotropy, the alignment liquid crystal film layer of the side chain type liquid crystal polymer or of liquid crystalline composition formed on the plastic film may be used for optical films in its natural condition. For example, these polymer substances may be used as an optical compensator in a liquid crystal display or a homeotropic alignment retardation film, without transferring the alignment liquid crystal film layer to another plastic film. Besides, the above-mentioned side chain type liquid crystal polymer or the alignment liquid crystal film layer of liquid crystalline composition formed on the plastic film or metal films, such as aluminum foil, having optical anisotropy is transferred directly or via adhesives onto a plastic film that has transparency and low optical anisotropy, such as a film having norbornene structure and cellulose triacetate, after forming the above-mentioned side chain type liquid crystal polymer or liquid crystalline composition into an alignment liquid crystal film. Thus the above mentioned liquid crystal polymer or the alignment liquid crystal film layer may be used for optical films, such as a compensating film.

The side chain type liquid crystal polymer or liquid crystalline composition may be coated onto a substrate using a solution coating method using a solution of the side chain type liquid crystal polymer or the liquid crystalline composition in solvents, or a molten coating method using a molten liquid crystal polymer or liquid crystalline composition. In these two methods, a method in which a solution of the side chain type liquid crystal polymer or the liquid crystalline composition is coated onto a supporting substrate is preferable, using the above-mentioned solution coating method.

As a solvent used when a solution is prepared, although a situation varies with kinds of a side chain type liquid crystal polymer or a liquid crystalline composition, or a substrate and it cannot be generally discussed, but usually, halogenated hydrocarbons, such as chloroform, dichloro methane, dichloroethane, tetrachloroethane, trichloroethylene, tetrachloroethylene and chlorobenzene; phenols, such as phenol and parachlorophenol; aromatic hydrocarbons, such as benzene, toluene, xylene, methoxy benzene, 1,2-dimethoxy benzene; as well as, acetone, ethyl acetate, tert-butyl alcohol, glycerin, ethylene glycol, triethylene glycol, ethylene glycol monomethyl ether, diethylene glycol dimethyl ether, ethyl cellosolve, butyl cellosolve, 2-pyrolidone, N-methyl-2-pyrolidone, pyridine, triethyl amine, tetrahydrofuran, dimethyl formamide, dimethyl acetamide, dimethyl sulfoxide, acetonitrile, butyro nitrile, carbon disulfide, etc. may be used. Although it cannot be generally discussed since a concentration of solution is dependent on the solubility of the side chain type liquid crystal polymer or the liquid crystalline composition used, and on thickness of a film of the alignment liquid crystal film finally obtained, usually, the concentration is in a range of 3 to 50 weight percent, preferably of 7 to 30 weight percent.

The thickness of the coated homeotropic alignment liquid crystal film layer, comprising the coated above-mentioned side chain type liquid crystal polymer or liquid crystalline composition, is preferably 1 to 10 μm. In addition, since the film thickness is mostly determined at the stage of coating on a substrate, especially in the case where the film thickness of the homeotropic alignment liquid crystal film needs to be controlled precisely and accurately, the control of a concentration of the solution and a film thickness of the film to be coated etc. should be carried out with special care.

As a method of coating the solution of the side chain type liquid crystal polymer or the liquid crystalline composition adjusted to a desired concentration using the above-mentioned solvent, for example, a spin coating method and a bar coating method etc. may be employed. After coating, the solvent is removed and a liquid crystal polymer layer is formed on the substrate. Conditions of removing the solvent are not especially limited, and if the solvent is removed in general, and if the liquid crystal polymer layer does not flow around or does not flow off, any conditions may be adopted. Usually, methods such as drying at room temperature, drying in a drying furnace and heating on hot plate are adopted to remove the solvent.

Subsequently, the side chain type liquid crystal polymer layer or the liquid crystalline composition layer formed on the supporting substrate is changed into liquid crystal state, and homeotropically aligned. For example, heat treatment is performed so that liquid crystal polymer may be in a liquid crystal temperature range, and homeotropically aligned in the state of liquid crystal. Heat treatment may be performed by the same method as the above-mentioned drying method. Although it cannot be generally discussed about heat treating temperature since the heat treating temperature varies with the kinds of the side chain type liquid crystal polymer or the liquid crystalline composition and the supporting substrate to be used, the range is usually 60 to 300° C., preferably 70 to 200° C. Although heat treatment period is not generally discussed since it varies with the heat-treating temperature and the side chain type liquid crystal polymer or the liquid crystalline composition to be used or kinds of the substrate, it is in general chosen in a range of 10 seconds to 2 hours, preferably of 20 seconds to 30 minutes. When the heat treatment period is shorter than 10 seconds, homeotropic alignment may not be sufficiently formed.

Cooling operation is performed after heat treatment. Taking the homeotropic alignment liquid crystal film out of heating atmosphere in the heat treatment operation after the heat treatment performs cooling operation. Besides, compulsive cooling by air or by water etc. may be performed. By cooling the layer lower than the glass transition temperature of the liquid crystal polymer, alignment of the homeotropic alignment layer of the above-mentioned liquid crystal polymer or liquid crystalline composition is fixed.

In a liquid crystalline composition, a photopolymerizable liquid crystal compound is polymerized or cross-linked to fix the photopolymerizable liquid crystal compound using optical irradiation that is applied to the homeotropic liquid crystal alignment layer fixed. Thus, a homeotropic alignment liquid crystal film with improved durability is obtained. Optical irradiation is performed by, for example, ultraviolet irradiation. In order to fully promote the reaction, the ultraviolet irradiation treatment is preferably carried out in inert gas atmosphere. Usually a high-pressure mercury ultraviolet lamp that has illumination of about 80 to 160 mW/cm$^2$ is used in general. Lamp of another kind, such as meta-halide UV lamp and incandescence bulb may also be used. In addition, the liquid layer surface temperature at the time of ultraviolet irradiation is adjusted suitably using cooling processing, such as of cold mirror, of water cooling and others or of making line velocity higher so that the layer surface temperature may become within a range of liquid crystal temperature.

Thus, a thin film of the side chain type liquid crystal polymer or the liquid crystalline composition is formed and an alignment liquid crystal film is obtained that is homeotropically aligned and is fixed in a state of homeotropic alignment. The alignment liquid crystal layer concerned has molecules aligned in the same direction. Therefore, since it is common knowledge that freezes of aligning vector of this alignment liquid crystal layer, or stabilization and preservation of the anisotropic physical properties are attained. In such a thin film, these optical properties are confirmed and the film is used for various kinds of uses. The above-mentioned alignment liquid crystal layer is a thin film that has a positive uniaxial birefringence.

Alignment of homeotropic alignment liquid crystal obtained as mentioned above is quantified by measuring an optical retardation of the liquid crystal layer at an irradiance angle inclined from vertical. In homeotropic alignment liquid crystal film, this retardation value is symmetrical to vertical incidence. Various methods may be used for measuring an optical retardation, for example, automatic birefringence measuring equipment (by "Oak") and polarization microscope (by OLYMPUS OPTICAL CO., LTD.) may be used. This homeotropic alignment liquid crystal film is observed black through crossed Nicol polarizer.

The homeotropic alignment liquid crystal film thus obtained may be used by being removed from a substrate or may be used as an alignment liquid crystal layer formed on a substrate as it is without being removed.

The homeotropic alignment liquid crystal film of the present invention may be independently used as a retardation film (a retardation plate), a viewing angle compensating film and a compensating film. On the occasion of practical use, it may be used as an optical film laminated together with other optical layers, such as a polarization plate. For example, when a homeotropic alignment liquid crystal film is manufactured using a retardation film that is uniaxially aligned, a retardation film with wide viewing angle may be obtained. The display characteristic of a liquid crystal display, especially the viewing angle characteristics, may be remarkably improved by applying this film to an STN type liquid crystal display.

A polarization plate is used for an optical film applied to a visual display, such as a liquid crystal display. The polarizing plate usually has protective films on one or both sides of a polarizer. A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be used. In these, a polyvinyl alcohol type film on which dichromatic materials (iodine, dyes) is absorbed and aligned after stretched is suitably used. Although thickness of polarizer is not especially limited, a thickness of about 5 to 80 $\mu$m is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. The film may also be dipped in aqueous solutions, such as boric acid and potassium iodide, if needed. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As a protective film prepared in one side or both sides of the above-mentioned polarizer, materials with outstanding transparency, mechanical strength, heat stability, moisture cover property, isotropy, etc. are preferable. Examples of such protective films include polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Other examples of the polymers forming a protective film include polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. In addition, a film comprising resins of a heat curing type or an ultraviolet curing type, such as acrylics, urethane, acrylics urethane and epoxy and silicone may be used. Generally, thickness of the protective film is no more than 500 $\mu$m, preferably 1 to 300 $\mu$m and more preferably 5 to 200 $\mu$m.

As a protective film, cellulose type polymers, such as triacetyl cellulose, is preferable by reason of polarization characteristics and durability etc. Especially triacetyl cellulose film is preferable. In addition, when protective film is prepared on both sides of the polarizer, the protective film consisting of the same polymer material may be used on the front and the backside, or the protective films consisting of different polymer materials etc. may be used. The above-mentioned polarizer and the protective film are usually adhered via an aqueous pressure sensitive adhesive etc. As an aqueous pressure sensitive adhesive, polyvinyl alcohol type adhesives, gelatin type adhesives, vinyl type latex type adhesives, aqueous polyurethane adhesives, aqueous polyester adhesives, etc. may be mentioned.

The film may comprise a hard coat layer and be processed for antireflection, sticking prevention and diffusion or anti glare.

A hard coat processing is applied for the purpose of protecting the surface of the polarization plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarization plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarization plate to disturb visual recognition of transmitting light through the polarization plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight part. An anti glare layer may serve as a diffusion layer (viewing angle expanding function etc.) for diffusing transmitting light through the polarization plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective layer.

The above-mentioned polarization plate may be used as elliptical polarization plate or circular polarization plate on which the retardation plate is laminated. A description of the above-mentioned elliptical polarization plate or circular polarization plate will be made in the following paragraph. These polarization plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

An elliptical polarization plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarization plate in which three-dimensional refractive index is controlled may also preferably compensate prevent) coloring produced when a screen of a liquid crystal display is viewed from an oblique direction. Circularly polarization plate is effectively used, for example, when adjusting a color tone of a picture of a reflection type liquid crystal display that provides a colored picture, and it also has function of antireflection.

For example, a retardation plate may be used that compensates coloring and viewing angle, etc. caused by the birefringence of various wave plates or liquid crystal layers etc. Optical characteristics, such as retardation, may be controlled using laminated layer with two or more retardation plates, each having a suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyallylates and polyamides; oriented films comprising liquid crystal materials, such as liquid crystal polymer; and films on which an alignment layer of a liquid crystal material is supported may be used. The above-mentioned homeotropic alignment liquid crystal film may be used as such retardation plate.

The above-mentioned homeotropic alignment liquid crystal film may be laminated onto polarization plate as a viewing angle compensating film to be used as a wide viewing angle polarization plate. A viewing angle compensating film is a film for extending viewing angle so that a picture may look comparatively clearly, even when it is viewed from an oblique direction to a screen.

As such a viewing angle compensating retardation plate, in addition, a film having birefringence property that is processed by uniaxial stretching or orthogonal bidirectional stretching and a bidriectionally stretched film as inclined orientation film etc. may be used. As inclined orientation film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensating film is suitably combined for the purpose of prevention of coloring caused by change of visible angle based on retardation by liquid crystal cell etc. and of expansion of viewing angle with good visibility.

A compensating plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

Although there is no particular limitation about an optical layer laminated in practical use, one or more optical layers may be used for formation of liquid crystal display, such as a reflection plate and a semitransparent plate, etc. Especially, a reflection type polarization plate or a semitransparent type polarization plate may be used in which a reflection plate or a semitransparent reflector is further laminated on an elliptical polarization plate or a circular polarization plate, or a polarization plate in which a brightness enhanced film is further laminated on the polarization plate.

A reflective layer is prepared on a polarization plate to give a reflection type polarization plate, and this type of plate is used for a liquid crystal display in which incident light from a view side (display side) is reflected to give a display. This type of plate does not require built-in light sources, such as a backlight, but has an advantage that a liquid crystal display may easily be made thinner. A reflection type polarization plate may be formed using suitable methods, such as a method in which a reflective layer of metal etc. is, if required, attached to one side of a polarization plate through a transparent protective layer etc.

As an example of a reflection type polarization plate, a plate may be used on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particles into the above-mentioned protective film, on which a reflective layer of concavo-convex structure is prepared, may be used. The reflective layer that has a fine concavo-convex structure diffuses incident light by random reflection to prevent directivity and glaring appearance, and has an advantage of controlling unevenness of light and darkness etc. Moreover, the protective film containing fine particles has an advantage that unevenness of light and darkness may be controlled more effectively, since incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as vacuum deposition, ion plating, and sputtering, etc.

Alternatively, a reflection plate may also be used as a reflective sheet constituted by preparing a reflective layer on the suitable film for the transparent film. In addition, since a reflective layer is usually made of metal, it is desirable that the reflective side is covered with a protective film or a polarization plate etc. when used, from a viewpoint of preventing deterioration in reflectance by oxidation, of maintaining an initial reflectance for a long period of time and of avoiding preparation of a protective layer separately etc.

In addition, a semitransparent type polarizing plate may be obtained by preparing the reflective layer as a semitransparent type reflective layer, such as a half-mirror, etc., that reflects and transmits light. A semitransparent type polarization plate is usually prepared in the backside of a liquid crystal cell and it may form a liquid crystal display unit of a type in which a picture is displayed by an incident light reflected from a view side (display side) when used in a comparatively well-lighted atmosphere. This unit displays a picture, in a comparatively dark atmosphere, using embedded type light sources, such as a back light built in backside of a semitransparent type polarization plate. That is, the semitransparent type polarization plate is useful to obtain of a liquid crystal display of the type that saves energy of light sources, such as a back light, in a well-lighted atmosphere, and can be used with a built-in light source if needed in a comparatively dark atmosphere etc.

The combination of a polarization plate and a brightness enhanced film adhered together is usually disposed on a backside of a liquid crystal cell. A brightness enhanced film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. Thus, the combination of a brightness enhanced film and a polarization plate reflects light without the predetermined polarization state, while transmitting light with the predetermined polarization state by accepting a light from light sources, such as a backlight. This device makes light reflected by the brightness enhanced film further reversed through the reflective layer prepared on the backside and forces the light re-enter into the brightness enhanced film. This increases the quantity of the transmitted light through the brightness enhanced film by transmitting a part or all of the light as light with the predetermined polarization state. The polarization plate simultaneously supplies polarized light that is difficult to be absorbed in a polarizer, and increases the quantity of the light usable for a liquid crystal picture display etc., and as a result luminosity may be improved. When a brightness enhanced film is not used, most of the light entering through a polarizer from backside of a liquid crystal cell by the back light etc. with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display, etc. decreases, resulting in a darkened picture. A brightness enhanced film does not enter the light with the polarizing direction absorbed by the polarizer into the polarizer but reflects the light once by the brightness enhanced film, and further makes the light reversed through the reflective layer etc. prepared in the backside to re-enter the light into the brightness enhanced film. By this repeated operation, only when the polarization direction of the light reflected and reversed between the both has the polarization direction which may pass a polarizer, the brightness enhanced film transmits the light to supply it to the polarizer. As a result, the light from a backlight may be efficiently used for the display of a bright picture on the liquid crystal display screen.

The suitable films are used as the above-mentioned brightness enhanced film. Examples include: a multilayer thin film of a dielectric substance; a laminated film that has the characteristics of transmitting a linearly polarized light with a predetermined polarization axis, and of reflecting other light, such as the multilayer laminated film of the thin film having a different refractive-index anisotropy; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc.

Therefore, in the brightness enhanced film of a type that transmits a linearly polarized light having the above-mentioned predetermined polarization axis, the absorption loss by the polarization plate is controlled and the polarized light can be transmitted efficiently. In the brightness enhanced film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. Circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarization plate and a brightness enhanced film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarization plate may consist of multi-layered film of laminated layers of a polarization plate and two of more of optical layers as the above-mentioned separated type polarization plate. Therefore, a polarization plate may be a reflection type elliptically polarization plate or a semi-transmission type elliptically polarization plate, etc. in which the above-mentioned reflection type polarization plate or a semitransparent type polarization plate is combined with above described retardation plate respectively.

The above-mentioned elliptically polarization plate and an above-mentioned reflected type elliptically polarization plate are laminated plate combining suitably a polarization plate or a reflection type polarization plate with a retardation plate. This type of elliptically polarization plate etc. may be manufactured by combining a polarization plate (reflected type) and a retardation plate, and by laminating them one by one separately in the manufacture process of a liquid crystal display. On the other hand, the polarization plate in which lamination was beforehand carried out and was obtained as an optical film, such as an elliptically polarization plate, is excellent in a stable quality, a workability in lamination etc., and has an advantage in improved manufacturing efficiency of a liquid crystal display.

A pressure sensitive adhesive layer may also be prepared in an optical film of the present invention. A pressure sensitive adhesive layer may be used for attachment to liquid crystal cell, and also for laminating of an optical layer. In adhesion of the above-mentioned optical film, those optical axes may be adjusted so that they may give suitable configuration angle according to a desired retardation characteristics.

As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

Proper method may be carried out to attach an adhesive layer to one side or both sides of the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarization plate top or a optical film top using suitable developing methods, such as flow method and coating method, or a method in which an adhesive layer is once formed on a separator, as mentioned above, and is then transferred on a polarization plate or an optical film may be mentioned.

An adhesive layer may also be prepared on one side or both sides of a polarization plate or an optical film as a layer in which pressure sensitive adhesives with different composition or different kind etc. are laminated together. Moreover, when adhesive layers are prepared on both sides, adhesive layers that have different compositions, different kinds or thickness, etc. may also be used on front side and backside of a polarization plate or an optical film. Thickness of an adhesive layer may be suitably determined depending on a purpose of usage or adhesive strength, etc., and generally is 1 to 500 μm, preferably 5 to 200 μm, and more preferably 10 to 100 μm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarization plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical films and, if necessity, lighting system, and by incorporating driving circuit. In the present invention, except that an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned optical film has been located at one side or both sides of the liquid crystal cell, and with which a backlight or a reflective plate is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, antiglare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarization plate, while preparing the polarization plate on the surface side of the transparent electrode.

Since the retardation plate and the polarization plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarization plate and the retardation plate is adjusted to /4, the mirror surface of the metal electrode may be completely covered.

This means that only linearly polarized light component of the external light that enters as incident light into this organic EL display is transmitted with the work of polarization plate. This linearly polarized light generally gives an elliptically polarized light by the retardation plate, and especially the retardation plate is a quarter wavelength plate, and moreover when the angle between the two polarization directions of the polarization plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarization plate, it cannot be transmitted through the polarization plate. As the result, mirror surface of the metal electrode may be completely covered.

EXAMPLES

Although an embodiment of the present invention is explained using an example below, it goes without saying that the present invention may not be limited by the example.

Example 1

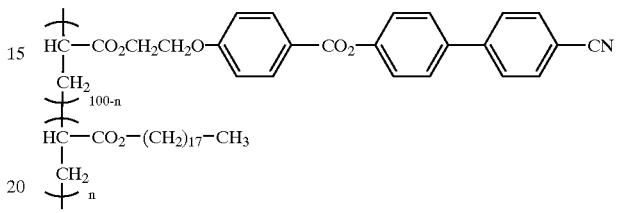

(where, n=18, shows mole % of monomer unit, represented in block groups for convenience, weight average molecular weight=5000) A solution of a side chain type liquid crystal polymer comprising 20 weight parts of the above described formula dissolved in 80 weight parts of dichloroethane was coated on a plastics film (20 $\mu$m) made of a polymer material of norbornene type resin (brand name Zeonor, by Zeon Corporation) using a spin coating method. Subsequently, after the coated film was heated for 1 minute at 160° C., it was cooled at a stretch to room temperature. The above-mentioned liquid crystal polymer layer was homeotropically aligned and vitrified while maintaining aligned state by this operation to obtain an alignment liquid crystal film with fixed homeotropic alignment liquid crystal layer (2 $\mu$m).

When the sample (homeotropic alignment liquid crystal film with a substrate) was observed from a perpendicular direction to the film surface using a polarization microscope with a crossed Nicol polarizer, nothing was observed from front. This meant that homeotropic alignment was confirmed. That is, it turned out that an optical retardation had not occurred. Transmitted light was observed by the microscope when this film was tilted and observed through the crossed Nicol polarizer with incident light entered from oblique direction.

Moreover, optical retardation of this film was measured by automatic birefringence measurement equipment. Light measured is entered into the sample surface from vertical or oblique direction, and homeotropic alignment was confirmed from the optical retardation and a chart of the angle of incident light measured. In homeotropic alignment, a retardation (front retardation) in the vertical direction to sample surface gives almost zero. When retardation was measured from the oblique direction to the phase delay axis direction of liquid crystal layer for this sample, a retardation value increased with an increase in the angle of incidence of measured light. This means that a homeotropic alignment was obtained.

Example 2

A homeotropic alignment liquid crystal film was manufactured as in Example 1 except that a norbornene type polymer (brand name Zeonex, by Zeon Corporation) was used as a polymer material of plastics film in Example 1. Subsequently, homeotropic alignment of the sample obtained was confirmed as in Example 1.

Example 3

A homeotropic alignment liquid crystal film was manufactured as in Example 1 except that a norbornene type polymer (brand name ARTON, by JSR Corporation) was used as a polymer material of plastics film in Example 1. Subsequently, homeotropic alignment of the sample obtained was confirmed as in Example 1.

Example 4

A homeotropic alignment liquid crystal film was manufactured as in Example 1 except that an aluminum foil (15 μm) was used as a substrate in Example 1 instead of the plastics film. Subsequently, homeotropic alignment liquid crystal film was transferred onto a cellulose triacetate film, and was separated from the substrate to obtain a sample film. Homeotropic alignment of the sample was confirmed as in Example 1.

Example 5

A homeotropic alignment liquid crystal film was manufactured as in Example 1 except that a glass substrate (1 mm) was used instead of the plastics film. Subsequently, homeotropic alignment of the sample obtained was confirmed as in Example 1.

Comparative Example 1

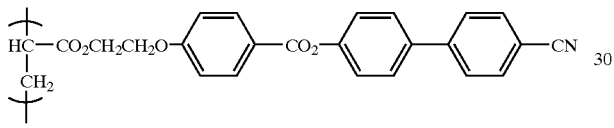

The same operation as in Example 1 was repeated except that side a chain type liquid crystal polymer (weight average molecular weight 5000) represented by the above described formula. Moreover, although the sample was evaluated as in Example 1, homeotropic alignment was not confirmed. The sample gave a white opaque color when observed from front side. This meant that the liquid crystal director faced to all directions and that the alignment of the liquid crystal was in disarrangement.

Example 6

A side chain type liquid crystal polymer shown in the Example 1 (where, n=35, shows mole % of monomer unit, represented in block groups for convenience, weight average molecular weight=5000) 12.5 weight parts; a photopolymerizable liquid crystal compound showing nematic liquid crystal propetry (PaliocolorLC242, by BASF A.G.) 12.5 weight parts; and five % of a photo polymerization initiator (Irgacure 907, by Ciba Specialty Chemicals) on the weight of the photopolymerizable liquid crystal compound were dissolved in cyclohexane 75 weight parts to obtain a solution. This solution was coated by spin coating method on a plastics film (20 μm) made of polymer material of norbornene type polymer (brand name Zeonex, by Zeon Corporation). Subsequently, after the coated film was heated for 1 minute at 130° C., it was cooled at a stretch to room temperature. The above described liquid crystal layer was homeotropically aligned and subsequently the homeotropic alignment liquid crystal layer obtained (2 μm) was fixed while maintaining aligned state. Furthermore, a homeotropic alignment liquid crystal film was obtained by irradiating ultraviolet to the fixed homeotropic alignment liquid crystal layer.

(Homeotropic alignment property)

When the sample (homeotropic alignment liquid crystal film with substrate) was observed from a vertical direction to the film surface using a polarization microscope with crossed Nicol polarizer, nothing was observed from front side. This meant that homeotropic alignment was confirmed. That is, it turned out that an optical retardation had not occurred. Transmitted light was observed by the microscope when this film was tilted and observed through the crossed Nicol polarizer with incident light entered from oblique direction. Moreover, optical retardation of this film was measured by automatic birefringence measurement equipment. A value of 30 nm was obtained when measured from 30° of lefts.

(Durability evaluation)

Three durability evaluation test were carried out; heat-resistant evaluation test in which the sample (a homeotropic alignment liquid crystal film with substrate) was left to stand in 90° C. drying furnace for 120 hours; heat and humidity evaluation test in which the sample was left to stand under conditions of 60° C./90% RH for 120 hours; and Heat-resistant of adhesion evaluation test in which a polarization film was attached onto the homeotropic alignment liquid crystal film through pressure sensitive adhesive and the laminated film obtained was left to stand in 90° C. drying furnace for 2 hours. Physical properties of the sample before and after the test were compared. In any of the three tests, no change was observed at all before and after the tests.

Example 7

A homeotropic alignment liquid crystal film was manufactured as in Example 6 except that a norbornene type polymer (brand name ARTON, by JSR Corporation) was used as a polymer material of plastics film in Example 6. Moreover, the homeotropic alignment property of the sample was confirmed as in Example 6. In addition, in any of the three above-mentioned durability tests, no change was observed at all before and after the tests.

Example 8

A homeotropic alignment liquid crystal film was manufactured as in Example 6 except that a glass substrate (1 mm) was used instead of a plastics film as a substrate in Example 6. In addition, the homeotropic alignment of the sample was confirmed as in Example 6. Moreover, in any of the three above-mentioned durability tests, no change was observed at all before and after the tests.

Example 9

A homeotropic alignment liquid crystal film was manufactured as in Example 6 except that in Example 6 the amount of the side chain type liquid crystal polymer used was changed into 2.5 weight parts, the amount of the photopolymerizable liquid crystal compound used was changed into 22.5 weight parts, and a glass substrate (1 mm) was used instead of a plastics film as a substrate. In addition, the homeotropic alignment of the sample was confirmed as in example 6. Moreover, in any of the three above-mentioned durability tests, no change was observed at all before and after the tests.

Referential Example 1

A homeotropic alignment liquid crystal film was manufactured as in Example 6 except that a photopolymerizable liquid crystal compound and a photo polymerization initiator were not used and only the side chain type liquid crystal polymer 25 weight parts was used in Example 6. In addition, the homeotropic alignment of sample was confirmed as in Example 6. However, in any of the three durability tests, some change of disarrangement etc. of alignment was confirmed after the tests.

What is claimed is:

1. A method for manufacturing a homeotropic alignment liquid crystal film comprising the steps of:

coating a side chain type liquid crystal polymer of a monomer unit (a) containing a liquid crystalline fragment side chain and a monomer unit (b) containing a non-liquid crystalline fragment side chain on a substrate on which a vertical alignment film is not formed, said liquid crystal polymer being a polymer prior to the coating thereof and being capable of homeotropic alignment by heating;

after the substrate is coated with the liquid crystal polymer which is in a liquid crystal state, heating the liquid crystal polymer to form a homeotropically-aligned liquid crystal polymer which shows nematic phase; and cooling the aligned liquid crystal polymer to a temperature lower than a glass transition temperature of the liquid crystal polymer to fix a resulting homeotropic alignment state of the liquid crystal polymer.

2. The method according to claim 1, wherein a material of said substrate is a polymer, glass or metal.

3. The method according to claim 1, wherein said monomer unit (a) comprises a monomer unit represented by the following formula:

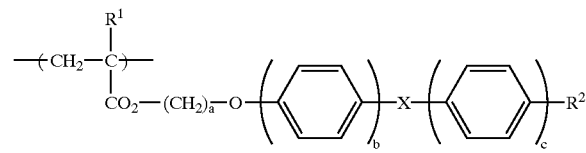

wherein $R^1$ is a hydrogen atom or a methyl group, a is a positive integer of 1 to 6, X is —$CO_2$— group or —OCO— group, $R^2$ is a cyano group, an alkoxy group with 1 to 6 carbon, fluoro group or alkyl group with 1 to 6 carbon, and b and c are integers of 1 or 2 respectively; and said monomer unit (b) comprises a monomer unit represented by the following formula:

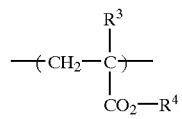

wherein $R^3$ is a hydrogen atom or a methyl group, $R^4$ is an alkyl group with 1 to 22 carbon, a fluoroalkyl group with 1 to 22 carbon, or a monomer unit represented by the following formula:

wherein d is a positive integer of 1 to 6, and $R^5$ is an alkyl group with 1 to 6 carbon.

4. The method according to claim 1, wherein said heating is conducted at 70° C.–200° C.

5. The method according to claim 1, wherein the step of homeotropically aligning the liquid crystal polymer by heating comprises heating the liquid crystal polymer at a temperature of 60–300° C. for a time period of 10 seconds to two hours.

6. A method for manufacturing a homeotropic alignment liquid crystal film comprising the steps of:

coating a liquid crystalline composition on a substrate on which a vertical alignment film is not formed, said composition being capable of homeotropic alignment by heating and comprising a side chain type liquid crystal polymer and a photopolymerizable liquid crystal compound, said side chain type liquid crystal polymer being a polymer prior to the coating of the liquid crystalline composition;

after the substrate is coated with the liquid crystalline composition which is in a liquid crystal state, heating the liquid crystalline composition to form a homeotropically-aligned liquid crystalline composition which shows nematic phase;

cooling the aligned liquid crystalline composition to a temperature lower than a glass transition temperature of the liquid crystal polymer to fix a resulting homeotropic alignment state of the liquid crystalline composition; and applying optical irradiation to the liquid crystalline composition to further fix the liquid crystalline composition.

7. The method according to claim 6, wherein a material of the substrate is a polymer, glass or metal.

8. The method according to claim 6, wherein said side chain type liquid crystal polymer comprises a monomer unit (a) containing liquid crystalline fragment side chain and a monomer unit (b) containing non-liquid crystalline fragment side chain, said monomer unit (a) comprising a monomer unit represented by the following formula:

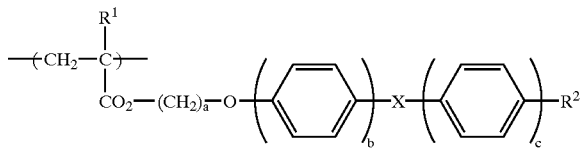

wherein $R^1$ is a hydrogen atom or a methyl group, a is a positive integer of 1 to 6, X is —$CO_2$— group or —OCO— group, $R^2$ is a cyano group, an alkoxy group with 1 to 6 carbon, fluoro group or alkyl group with 1 to 6 carbon, and b and c are integers of 1 or 2 respectively; and said monomer unit (b) comprising a monomer unit represented by the following formula:

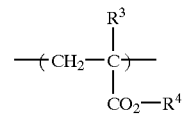

wherein $R^3$ is a hydrogen atom or a methyl group, $R^4$ is an alkyl group with 1 to 22 carbon, a fluoroalkyl group with 1 to 22 carbon, or a monomer unit represented by the following formula:

wherein d is a positive integer of 1 to 6, and $R^5$ is an alkyl group with 1 to 6 carbon.

9. The method according to claim 6, wherein said heating is conducted at 70° C.–200° C.

10. The method according to claim 6, wherein the step of homeotropically aligning the liquid crystalline composition by heating comprises heating the liquid crystalline composition at a temperature of 60–300° C. for a time period of 10 seconds to two hours.

* * * * *